United States Patent [19]

Rosengren

[11] Patent Number: 4,568,051
[45] Date of Patent: Feb. 4, 1986

[54] FLEXIBLE SUPPORT ARM

[75] Inventor: Lars O. Rosengren, Huskvarna, Sweden

[73] Assignee: Rosengren Teknik AB, Huskvarna, Sweden

[21] Appl. No.: 568,337

[22] Filed: Jan. 5, 1984

[30] Foreign Application Priority Data

Jan. 6, 1983 [SE] Sweden ................................ 8300188

[51] Int. Cl.[4] .............................................. A47F 5/00
[52] U.S. Cl. .................................... 248/276; 248/278; 248/281.1
[58] Field of Search ...................... 248/276, 278, 281.1, 248/282, 283, 284, 277, 324; 179/149, 150; 52/108, 109

[56] References Cited

U.S. PATENT DOCUMENTS

| 898,572 | 9/1908 | Gerhard | 248/282 |
|---|---|---|---|
| 986,445 | 3/1911 | Dekle | 248/284 |
| 995,771 | 6/1911 | Coyle | 248/277 |
| 1,326,650 | 12/1919 | Doerr | 248/284 |
| 1,804,134 | 5/1931 | Unger | 52/108 |
| 2,319,745 | 5/1943 | Napoli | 248/284 |
| 2,466,722 | 4/1949 | May | 248/276 |

FOREIGN PATENT DOCUMENTS

| 980084 | 5/1951 | France | 248/278 |
|---|---|---|---|
| 1123037 | 9/1956 | France | 248/278 |
| 432303 | 3/1948 | Italy | 248/284 |
| 553036 | 5/1943 | United Kingdom | 248/278 |

Primary Examiner—J. Franklin Foss
Assistant Examiner—Robert A. Olson
Attorney, Agent, or Firm—Holman & Stern

[57] ABSTRACT

A flexible support arm attached to a base at one end and supporting an object attached at the other end in a selected position is comprised of a plurality of segmented modules having segments arranged in partial overlapping relationship at their ends to form an elongated arm, pivot pins connecting the overlapping parts of the segments together so that adjacent modules are rotatable with respect to each other about the pivot axes, and the modules having a gradually decreasing number of segments from the base end to the outer end. The modules can be a plurality of parallel spaced elongated flat planar elements interfitted at their ends into spaces between the segments of adjacent modules, or the segments can be parallel spaced planar elements extending in opposite directions from the opposite sides of a central part of a single module. The large number of segments and the large contacting area at the interfaces of the segments of adjacent modules provide substantial friction to retain the flexible arm in any set position and even with a substantial load supported on the end.

10 Claims, 10 Drawing Figures

FLEXIBLE SUPPORT ARM

BACKGROUND OF THE INVENTION

1. Field of the Invention

The present invention is an improvement in flexible support arms of the type used for example to support work lamps, magnifying glasses, microphones, etc.

2. Description of the Prior Art

These arms are required to be easy to adjust in any selected position and this position is required to be stable and at the same time it should occupy as little room as possible. There are presently a few designs fulfilling only some of these requirements. The most common design uses a parallelogram mechanism with the balancing forces provided by diagonal springs. Such an arm is very easy to position and can be designed to carry a relatively heavy load but it has two important disadvantages: it occupies a fairly large space and is often difficult to mount, especially close to a wall; it has a limited positioning range, and it is usually difficult to position the lamp far back without the arm hitting the rear wall. The other common design is the so-called "goose neck", which is a friction-held spiral or a combination of short pipes and spherical pivots. This design is relatively flexible but has a very limited carrying capacity and is relatively difficult to lock in the required position.

BRIEF SUMMARY OF THE INVENTION

The present invention is an improved arm design permitting almost unlimited flexibility without occupying much space. The arm is also very easy to position and can, depending on the particular design, carry great loads.

BRIEF DESCRIPTION OF THE DRAWINGS

The following is a detailed description of an embodiments of the invention with reference to the accompanying drawings wherein.

DETAILED DESCRIPTION

Figures 1, 2:
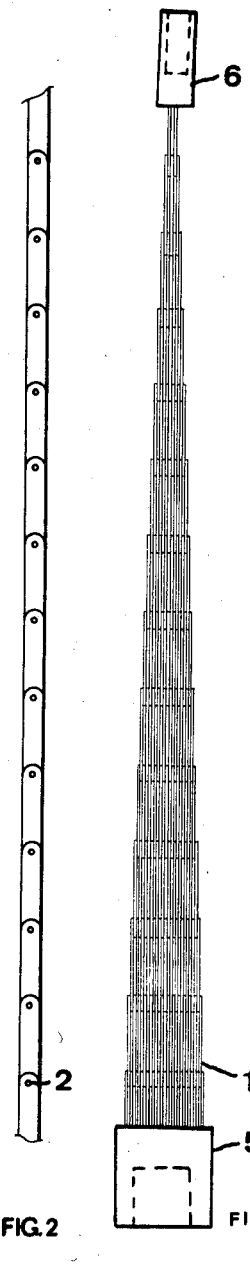
FIG. 1 is an elevational view showing a fully extended arm in accordance with the invention.
FIG. 2 is a partial side view of FIG. 1.
Figure 5:
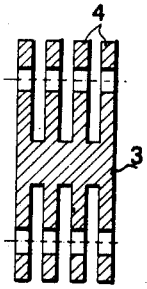
FIG. 5 is a cross-sectional view of one module of a flexible arm according to the invention.
Figure 6:
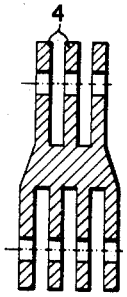
FIG. 6 is a view similar to FIG. 5 showing a different embodiment of a module of a flexible arm according to the invention.
Figure 7:
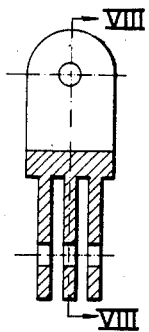
FIG. 7 is a cross-sectional view showing another embodiment of a module of a flexible arm according to the invention.
Figure 8:
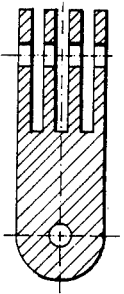
FIG. 8 is a cross-sectional view taken along line VIII—VIII of FIG. 7.
Figure 9:
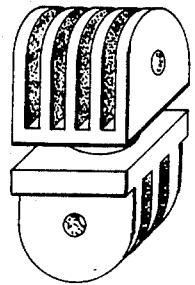
FIG. 9 is a perspective view of a rotatable module of a flexible arm according to the invention.
Figure 10:
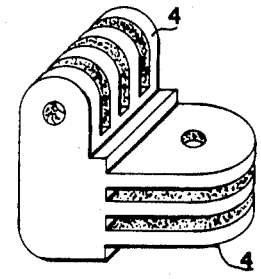
FIG. 10 is a perspective view of an angled module of a flexible arm according to the invention.
Figure 4:
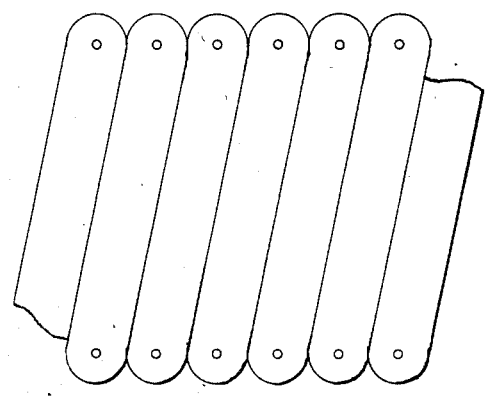
FIG. 4 is a side view of FIG. 4.
Figure 3:
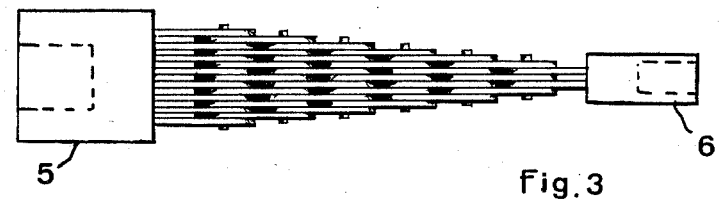
FIG. 3 is a view similar to FIG. 1 showing the arm fully folded.

The arm includes a number of modules that in turn are made up of individual flag segments or "plates" according to the example in FIG. 1.

The segments are rotatably connected near their ends to one another and are held together by pivot pins 2 shown in FIG. 2. These pivot pins hold the modules together and provide the necessary normal force to obtain a suitable locking friction in each module so that the desired position is retained. The modules can be made up of individual segments according to the example of FIG. 2 or by a composite part 3 in which the ends have been provided with the corresponding spaced segments 4 as shown in FIGS. 5 to 10. In these embodiments the maximum possible angle of displacement is decreased slightly but a simplified assembly of the unit is gained.

FIGS. 1 through 4 show a complete arm with end pieces 5 and 6. End piece 5 is normally the base and has the module with the greatest number of segments attached thereto. End piece 6 is normally a support element for an object to be supported on the outer end of the arm, or the object itself. The very large positioning range can be seen from the figures. If modules are made with the segments integral with the same module on the outside at both sides according to FIG. 5 the possibility of using a simple machine screw with its corresponding nut will be gained without risking unscrewing of the nut by the positioning motions. In this way it will be possible to adjust the friction forces by simply adjusting the nut correspondingly. Due to the fact that the module consists of several segments with a large area of contact, a suitable frictional holding power can be obtained without having to tighten the pivots excessively. By varying the number of segments in each module so that the lower modules have more and the upper modules have fewer segments, it will be easy to optimize both stiffness, friction power and carrying capacity so that the arm will have optimum strength.

To increase the positioning range further, it is possible to insert, at selected modules, specially designed sections permitting the turning of the pivoting direction and correspondingly the bending direction. This kind of section can be designed in different ways, e.g., according to the suggestions shown in FIGS. 7-10.

A further advantage of the invention is the fact that it permits a wide selection of construction materials and methods. It is, for example, possible to make it entirely out of thermoplastic material with molded complete modules or separate segments that can alternately be machined or punched out of sheet material such as plexiglass. It would further be possible to make the segments out of standard profiles, for example, extruded aluminum. Due to these possibilities many opportunities exist to make a suitably attractive and aesthetic design.

I claim:

1. A flexible support arm having a base end at one end attached to a base and supporting an object attached to the arm at the other end in a selected position comprising:

a plurality of segmented modules each having a plurality of segments comprised of individual planar elements arranged in parallel spaced relationship which are in partial overlapping relationship with respect to segments of adjacent modules to form an elongated arm; each module except the module at said other end having a plurality of segments greater than a pair; and means to pivotally connect the overlapping parts of said segments together so that adjacent modules are rotatable with respect to each other about respective pivot axes;

the modules having a gradually decreasing number of segments from the base end to the other end, wherein the different number of segments of the modules is selected to produce optimum strength of the arm.

2. A flexible arm as claimed in claim 1 wherein said segments comprise separate individual members, arranged in spaced relationship, at least some of the segments of a module being partially interfitted in the spaces between the segments of adjacent modules.

3. A flexible arm as claimed in claim 1 wherein said modules further comprise:
at least some of the segments of a module being interfitted in the spaces between the segments of adjacent modules;
two spaced holes through each planar element in the overlapping portions thereof, said holes being aligned with each other and with the holes in the overlapping portions of the planar elements of adjacent modules; and
pivot pins extending through the aligned holes to pivotally connect adjacent modules together.

4. A flexible arm as claimed in claim 3 wherein said planar elements comprise elongated flat plate elements and said holes are near each end of each element.

5. A flexible arm as claimed in claim 1 wherein each module comprises:
a unitary body having a central part and spaced parallel planar segments extending outwardly and oppositely with respect to each other from opposite sides of said central part, at least some of said segments of a module being interfitted in the space between segments of adjacent modules.

6. A flexible arm as claimed in claim 5 and further comprising:
aligned holes in said segments of each module near the outer portions thereof, said holes of each module being aligned with the holes of adjacent modules;
at least partially threaded pivot bolts extending through said aligned holes of adjacent modules to connect said modules together; and
cooperating threaded nuts on said bolts to facilitate adjusting frictional force at the contacting interfaces of the overlapping portions of said segments.

7. A flexible arm as claimed in claim 6 wherein said segments are elongated.

8. A flexible arm as claimed in claim 7 wherein at least some of said modules have a different number of segments extending from the opposite sides of the central part thereof.

9. A flexible arm as claimed in claim 5 wherein the pivot axes at opposite ends of at least some of said modules are not parallel so that the direction of rotation of said at least some modules is different than adjacent modules to provide flexibility of the arm in different directions along its length.

10. A flexible arm as claimed in claim 8 wherein the pivot axes at opposite ends of at least some of said modules are not parallel so that the direction of rotation of said at least some modules is different than adjacent modules to provide flexibility of the arm in different directions along its length.

* * * * *